United States Patent [19]

Schiffleger

[11] Patent Number: 4,745,545

[45] Date of Patent: May 17, 1988

[54] MEMORY REFERENCE CONTROL IN A MULTIPROCESSOR

[75] Inventor: Alan J. Schiffleger, Chippewa Falls, Wis.

[73] Assignee: Cray Research, Inc., Minneapolis, Minn.

[21] Appl. No.: 750,099

[22] Filed: Jun. 28, 1985

[51] Int. Cl.⁴ .......................................... G06F 13/14
[52] U.S. Cl. .................................................. 364/200
[58] Field of Search ..................... 364/200 MS File

[56] References Cited

U.S. PATENT DOCUMENTS

| | | | |
|---|---|---|---|
| 3,317,898 | 5/1967 | Hellerman | 364/200 |
| 3,348,210 | 10/1967 | Ochsner . | |
| 3,444,525 | 5/1969 | Barlow et al. | 364/200 |
| 3,643,227 | 2/1972 | Smith et al. | 364/200 |
| 3,916,383 | 10/1975 | Malcolm | 364/200 |
| 4,047,161 | 9/1977 | Davis | 364/200 |
| 4,104,720 | 8/1978 | Gruner | 364/200 |
| 4,115,851 | 9/1978 | Nagano et al. | 364/200 |
| 4,128,880 | 12/1978 | Cray, Jr. | 364/200 |
| 4,130,864 | 12/1978 | Schlotterer | 364/200 |
| 4,145,738 | 3/1979 | Inoue et al. | 364/200 |
| 4,270,181 | 5/1981 | Tanakura et al. | 364/200 X |
| 4,280,176 | 7/1981 | Tan | 364/200 |
| 4,293,941 | 10/1981 | Muraoka et al. | 364/200 |
| 4,310,879 | 1/1982 | Pandeya | 364/200 |
| 4,365,292 | 12/1982 | Barnes et al. | 364/200 |
| 4,374,410 | 2/1983 | Sakai et al. | 364/200 |
| 4,380,798 | 4/1983 | Shannon et al. | 364/200 |
| 4,392,200 | 7/1983 | Arulpragasam et al. | 364/200 |
| 4,394,725 | 7/1983 | Bienvenu et al. | 364/200 |
| 4,394,727 | 7/1983 | Hoffman et al. | 364/200 |
| 4,394,730 | 7/1983 | Suzuki et al. | 364/200 |
| 4,400,769 | 8/1983 | Kaneda et al. | 364/200 |
| 4,400,771 | 8/1983 | Suzuki et al. | 364/200 |
| 4,435,765 | 3/1984 | Uchida et al. | 364/200 |
| 4,435,792 | 3/1984 | Bechtolsheim . | |
| 4,442,487 | 4/1984 | Fletcher et al. | 364/200 |
| 4,489,381 | 12/1984 | Lavallee et al. | 364/200 |
| 4,490,786 | 12/1984 | Nakatani | 364/200 |
| 4,493,027 | 1/1985 | Katz et al. | 364/200 |
| 4,507,728 | 3/1985 | Sakamoto et al. | 364/200 |
| 4,517,640 | 3/1985 | Hattori et al. | 364/200 |
| 4,661,900 | 4/1987 | Chen et al. | 364/200 |

*Primary Examiner*—Thomas M. Heckler
*Attorney, Agent, or Firm*—Merchant, Gould, Smith, Edell, Welter & Schmidt

[57] ABSTRACT

A memory interface and conflict resolution network for a multiprocessor system. The memory is multisectional and each section of memory has a plurality of individually addressable memory banks organized in an interleaved fashion and a section level conflict resolution network. Each processor in the system includes several ports and a gating network such that each port may access any section of memory, but access is restricted to no more than one reference per processor per clock period to each section of memory. References generated from different ports of the same processor are automatically synchronized. Each processor has a conflict resolution circuit to resolve conflicts between different ports seeking access to the same section of memory. Conflict resolution is achieved in two clock periods with conflicts between different ports of a processor resolved in the first clock period and conflicts between different processors seeking access to the same banks of any particular section of memory resolved in the second clock period.

13 Claims, 4 Drawing Sheets

MEMORY REFERENCE CONTROL IN A MULTIPROCESSOR

TECHNICAL FIELD OF THE INVENTION

The present invention pertains generally to the field of multiprocessor computer systems and more particularly to a method and apparatus for coordinating memory references to a shared main memory.

BACKGROUND OF THE INVENTION

In many cases the data processing speed of a computer system can be greatly enhanced by providing one or more additional processors to form a multiprocessor system in which a common or central RAM memory is shared. However, the sharing of resources, particularly the memory, results in conflicts between the processors' various memory reference requests, such that if the memory and the memory access control logic is not properly designed much of the potential increase in efficiency and economy of the system can be lost to access delays.

Minimizing conflicts and delays in accessing a shared memory is typically accomplished in two different but cooperative ways. One way is to segment the shared memory into many independently addressable banks such that each reference to a bank ties up a relatively small percentage of the memory, leaving the rest of the memory accessible. This approach, however, entails an increase in the complexity and thus size and cost of the memory, and can also impose limitations on the speed at which each reference may be accomplished.

The other approach to minimizing memory reference delays involves the interface between each processor and the available memory access paths, and the treatment of conflicting requests to memory either between individual ports in a processor or between different processors. As may be readily appreciated, this approach must be cooperative with the former approach as the design of the interface must correspond to the number of independent access paths between the memory and the processors.

Ideally, the memory interface should provide for maximum utilization of the available memory access paths and that each processor has substantially equal accessibility to the memory at most times, particularly where there is no master-slave relationship between the processors. In addition, it is desireable that memory conflicts be resolved in as few system clock periods as possible so that reference start up time and data buffering requirements are held to a minimum. The attainment of these goals is, however, restrained by the cost and particularly the quantity of logic which may be employed. In particular, in the case of high-speed vector processing machines there are tight restrictions on the space which may be alotted to interface circuits due to the necessity to bring all processors into close proximity to the memory in order that propagation delays be minimized. In addition, it is desireable that wiring requirements be held down.

As is well appreciated by those skilled in the art, attaining an efficient, economical and workable memory interface becomes increasingly difficult as the number of processors is increased. Those designs which may be quite efficient in a dual processor system may be totally unuseable in a four processor system because of the geometric increases in logic which are needed to adapt a dual processor scheme to a larger number of processors. Moreover, increasing the number of processors typically increases the nominal distance between a given processor and the memory, increasing signal propagation delay and placing further restraints on the number of logic levels which may be employed.

SUMMARY OF THE INVENTION

The present invention provides a memory interface and conflict resolution network for a multiprocessing system, and in particular a multiprocessing system with four processors. In its more general aspects the present invention provides for a four section memory with each section of memory having a plurality of individually addressable memory banks. Associated with each section of memory is a section level conflict resolution network. Each processor in the system includes several ports which may generate reference requests to any one of the sections in the memory. A gating network is associated with each CPU such that each port may access any section of the memory but which restricts access to no more than one reference per CPU per clock period to each section of memory. To resolve conflicts between different ports in a CPU seeking access to the same section of memory a port conflict resolution circuit is provided for each CPU.

With respect to conflict resolution, the present invention provides for a two clock period conflict resolution delay. During a first period conflicts between different ports in a CPU are resolved, and the prevailing reference request is forwarded to the section level conflicts resolution networks. During the second clock cycle, conflicts between different CPUs seeking access to the same banks in a particular section of memory are resolved.

According to a more particular aspect of the invention there is provided automatic synchronization of references generated from different ports within the same CPU. To this end the memory banks are organized into each section of memory in a sequential and interleaved fashion, such that, for example, section 0 includes banks 0, 1, 2 and 3 while section 1 includes banks 4, 5, 6 and 7. Accordingly, in the case of a typical memory reference incrementing from bank to bank one bank at a time the ports are forced into synchronization. This feature, together with the others mentioned above, and including other salient features of the invention will be described below in more detail in the ensuing specification and drawings.

DETAILED DESCRIPTION OF THE INVENTION

The present invention relates to a system for interfacing a plurality of CPU's to a central or shared memory. In particular, the invention is tailored for a multiprocessor system in which each processor is capable of generating memory references from several independent ports each of which may operate substantially independently of the CPU to carry out data and instruction transfers. An example of a CPU of the type which the present invention is adapted to interface is shown in co-pending application Ser. No. 488,083, filed Apr. 25, 1983, and entitled "Computer Vector Multiprocessing Control."

Figure 1A:
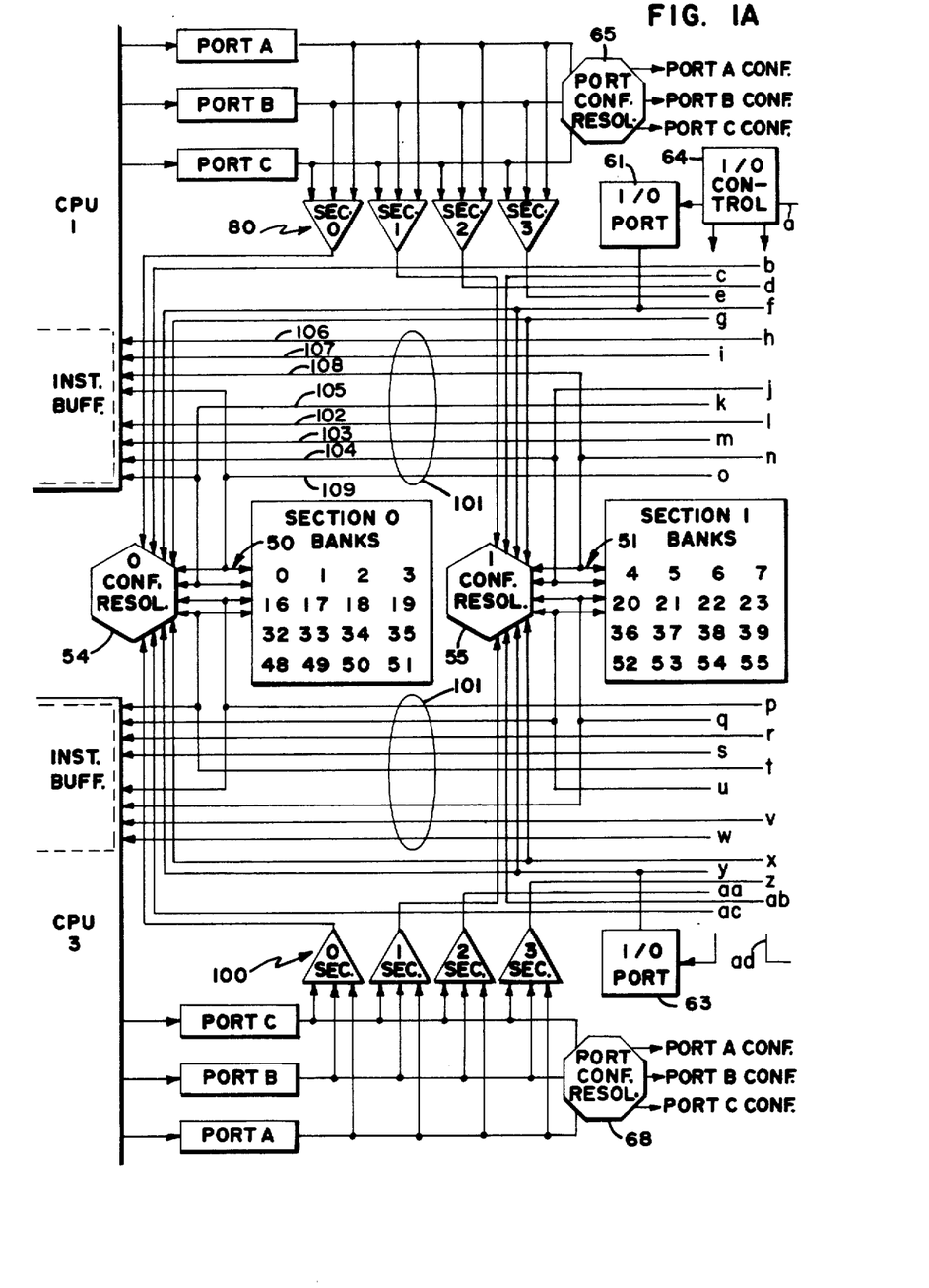
FIGS. 1A and 1B comprises a schematic block diagram of the multiprocessor memory reference control circuit according to the present invention.
Figure 1B:
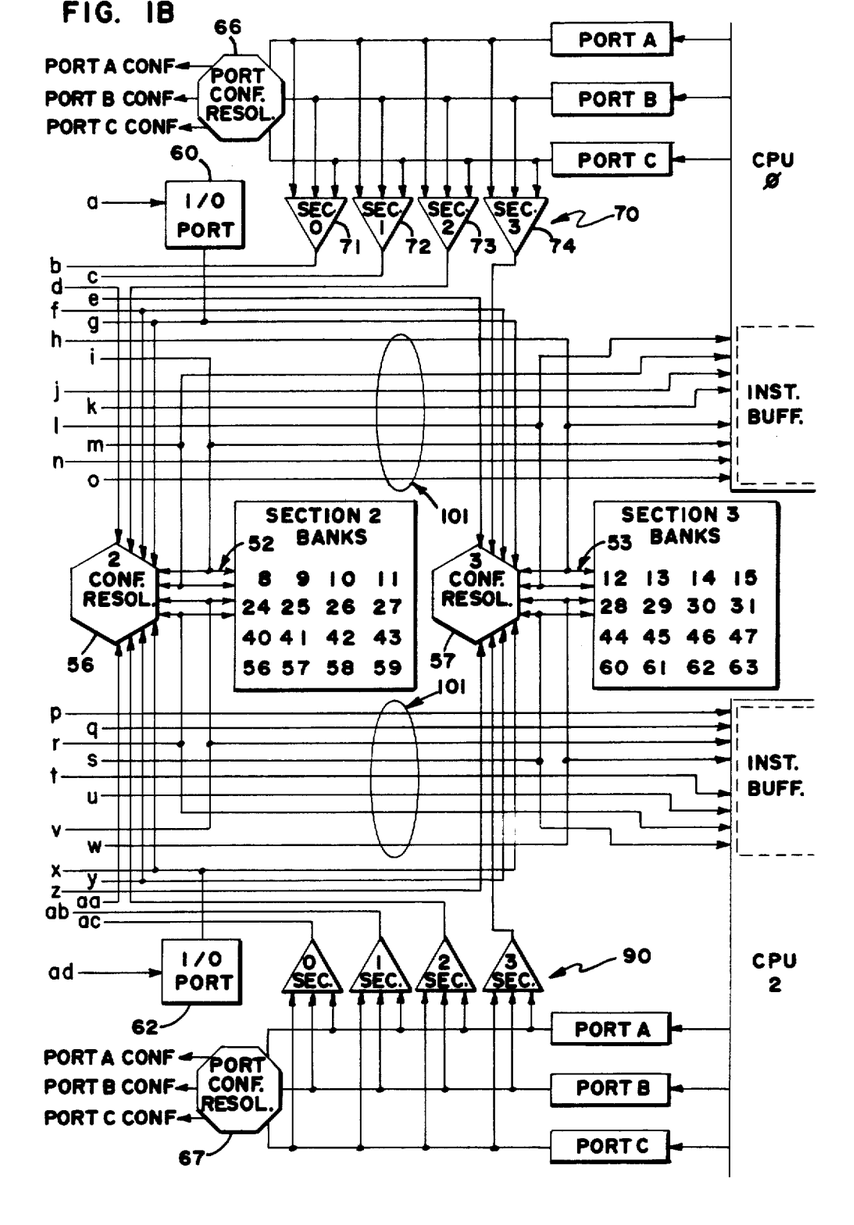

Laid side by side FIGS. 1A and 1B comprise a schematic block diagram of the memory interface and reference control circuit (hereinafter sometimes referred to as "interface circuit") according to the present invention with lower case alpha characters identifying corresponding signal paths between the figures. Referring to FIGS. 1A and 1B it will be seen that the interface circuit of the present invention interfaces four central processing units, i.e. CPU0-CPU3, to the four sections 0-3 of a shared or central digital memory.

Each of sections 0-3 of the shared memory include sixteen banks, organized in an interleaved fashion. For instance, section 0 includes banks 0-3, 16-19, 32-35 and 48-51. Each bank contains a number of individually addressable memory locations each with its own unique address. Each bank may function independently of the others, i.e. each may be referenced individually and/or simultaneously with another bank within the same or other sections. However, although different banks may be accessed or referenced simultaneously, the present invention contemplates that no one bank may be referenced more than once every four system clock cycles, due to the recovery time of the memory.

Each of sections 0-3 include four independent access paths, i.e. paths 50-53 for sections 0-3 respectively. Each access path includes one memory address path, one write data path, one read data path, and one control path. An access path will allow one memory reference, either a read or a write, during each system clock cycle. Thus, up to four banks in each section may be referenced in each clock cycle, and up to 16 memory references are possible in the same clock cycle.

Each of CPU's 0-3 includes three main ports, i.e. port A, port B, and port C, via which data transfers between the individual registers in a CPU and the memory may be controlled. Preferably, a port is dedicated to performing either read or write references. For instance, ports A and B may be used exclusively to control the reading of data into the CPU, while port C may be used only to control the writing of data from the CPU to memory.

In FIGS. 1A and 1B the address carrying paths from ports A, B and C are shown separately from the data carrying paths. References generated via ports A, B and C are directed through gates 70, 80, 90, 100 and conflict circuits 54-57, after which they are introduced to the memory via access paths 50-53. Actual data transfers occur over data paths 101, which are connected between each CPU and the access paths 50-53. Specifically, each CPU is interfaced to eight data paths, for instance 102-109 for CPU 0. Four of the eight paths, e.g. 102-105, are dedicated to a processor providing it one data path to each section of memory. The other four paths, e.g. 106-108, are "tapped" from another CPU's dedicated paths. For instance, paths 106-109 are dedicated to CPU 1 and shared by CPU 0, while paths 102-105 are dedicated to CPU 0 and shared by CPU 1. As illustrated, CPUs 2 and 3 are connected to the memory in a like manner to CPUs 0 and 1.

Each processor also includes in association therewith an I/0 port, i.e. I/O ports 60-63 for CPU's 0-3 respectively. Each of I/O ports 60-63 are provided for referencing the shared memory during transfers with the various I/O devices which support the multiprocessor system, such as a solid state storage device, magnetic tape storage devices or disk storage devices etc. A central or master I/O control circuit 64 is provided, and is interfaced (not shown) between each of CPU's 0-3 and each of I/O ports 60-63. I/O control Γmay receive instructions or I/O requests from any one of the processors and allocate the received requests to one of the I/O ports 60-63, which then carry out the generation of individual memory references required to either read or write data to the shared memory. Although each processor has an associated I/O port, the I/O interface system provides that any I/O port may accomplish I/O functions for any one of the CPU's in the system, such that the I/O interfaces are a "shared resource". It shall be understood, however, that the particular scheme for interfacing shared memory to the I/O which is herein disclosed is not essential to the memory reference control circuit of the present invention. As in the case of the A, B, and C ports, data transferred during I/O operations is conveyed on paths 101, via which the data may be directed to I/O devices via a CPU data channel.

Each CPU also includes a "fetch or exchange" port (not shown) via which fetch or exchange addresses may be generated for submission to memory. The fetch and exchange operations will be described in more detail below.

Generally, memory referencing is carried out via the A, B, C and I/O ports through the dedicated data paths, such that all processors may be accessing memory simultaneously. During fetch or exchange operations, however, a processor "commandeers" the shared data paths such that it has access to eight paths (read only in the case of the shared paths) simultaneously, and such that up to two references per section may be accomplished per clock period, as will be explained below in more detail.

Each of the A, B, C and I/O ports for each CPU is interfaced to the four memory (reference) access paths of each section of the memory via a "section level" conflict resolution circuit, i.e. conflict resolution circuits 54-57, which correspond respectively to memory sections 0-3. Each I/O port has a direct path to each section level conflict resolution circuit, while each of the A, B and C ports of each CPU is selectively gated thereto through a single path. This gating arrangement, for example with respect to CPU 0 and gates 71-74, provides that any one of the ports A, B or C may have access to any given section of memory via the corresponding section level conflict resolution circuit. However, no more than one of the ports A, B or C may have access to the same section of the memory at any given time.

Each of the CPU's for which the memory reference control circuit of the present invention is particularly suited includes an instruction buffer for holding a "block" of CPU instructions. The instruction buffers are loaded with a set of instructions each time a CPU takes up a new job or from time to time as necessary to replenish the buffer as is known as a "fetch" operation. In addition, as a CPU switches from job to job it is necessary to perform an "exchange" operation, via which the contents of various CPU registers are stored in memory, and correspondingly the registers are reloaded with new data previously so stored. Because fetch and exchange operations must be performed quickly to minimize the idle time of the CPU, special access to the shared memory is provided for fetch and exchange operations. As described above, each CPU has eight independent memory reference data paths such that each CPU is provided with two independent access paths to each section of the memory. Accordingly, when it is necessary to load instructions into the instruction buffers, i.e. "fetch" instructions, the fetching CPU takes over the shared data paths and uses all eight available paths to fetch instructions. Of course, the other CPU in the pair cannot make a reference during this time. To provide for unimpeded memory access for both fetch and exchange operations, the fetch and exchange reference addresses bypass the section level conflict resolution networks 54-57, which, as will be explained below in more detail, hold all other potentially conflicting references during fetch or exchange operations.

As generally described above the memory interface of the present invention provides for a "two-level" system of reference conflict resolution. The first, "port", level of conflict resolution is interposed between the ports A, B and C and the section conflict resolution circuits 54-57. This first level of resolution occurs at the gates 70, 80, 90 and 100 for CPU's 0-3 respectively. For example, with respect to CPU 0, each of gates 71-74 may select one reference from any one of the three ports A, B and C for routing to a particular one of conflict resolution circuits 54-57.

A "port" conflict resolution circuit operative to resolve first level conflicts is provided for each CPU, i.e. port conflict resolution circuits 65-68 for CPU's 0-3 respectively. Each of these port conflict resolution circuits is operative to control the gating of references through the port level gates 70, 80, 90 and 100, resolve conflicts, and to inhibit the generation of references from a selected port when a conflict occurs. For instance, if during the time that a reference from port A of CPU 0 is being directed through gate 71 to memory section 0 port B attempts a reference to section 0, port conflict resolution circuit 65 will detect the conflict and generate a port B conflict signal which will cause port B to hold the conflicting reference until the port A reference has cleared, at which time gate 71 may be switched to direct the port B reference through to section 0 of the memory. It shall be understood that port conflict circuits 65-68 and gates 70, 80, 90 and 100 receive only the lower bits of each references address, i.e. those bits indicative of which bank a reference is directed to, which is all the information needed to resolve conflicts. The remaining upper bits are submitted to the memory if the reference is allowed to proceed via address paths, for which, for the sake of brevity, are not shown.

Figure 2A:
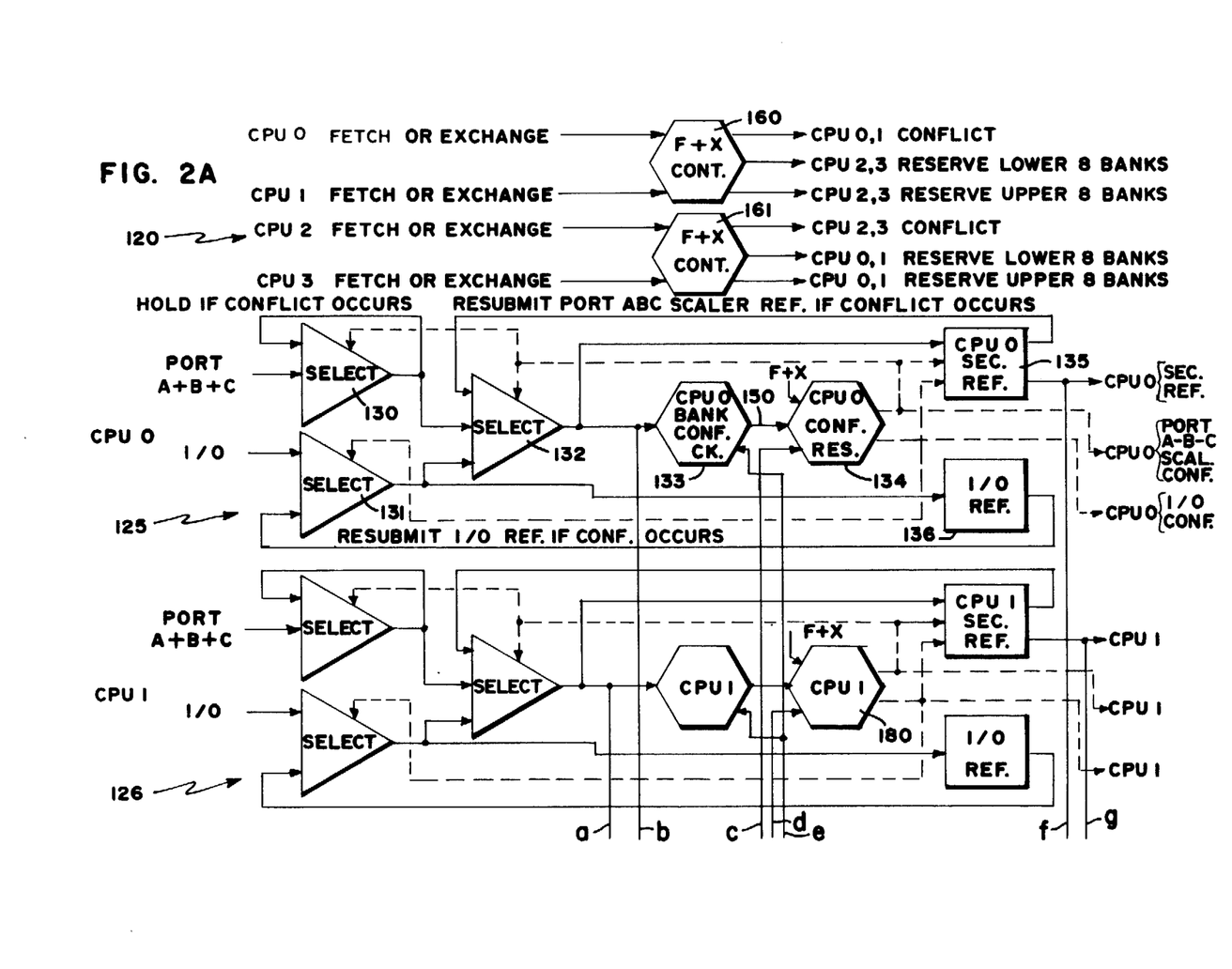
FIGS. 2A and 2B comprise a schematic block diagram of one section level conflict resolution circuit according to the present invention.
Figure 2B:
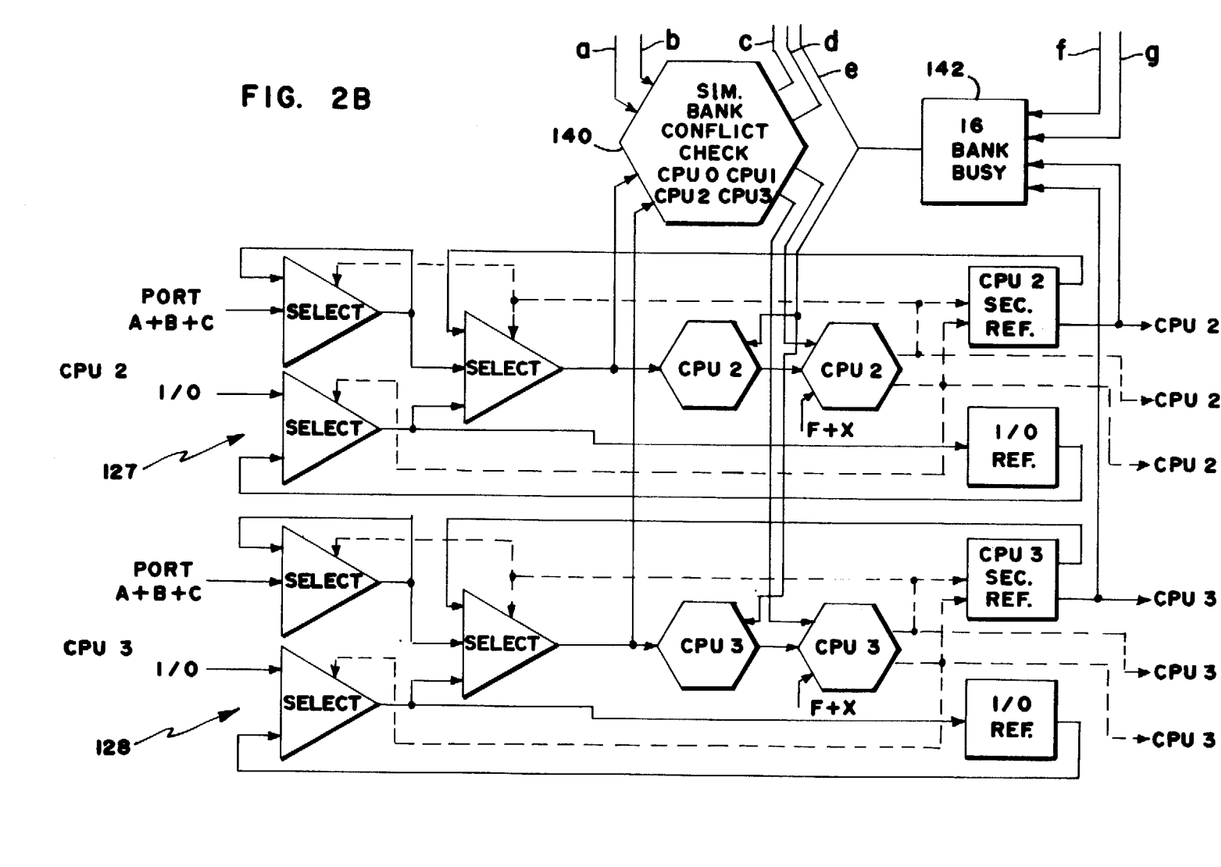

References passed through gates 70, 80, 90 and 100 or generated via the I/O ports are routed through one of the section level conflict resolution circuits 54-57. FIGS. 2A and 2B together comprise a schematic block diagram of one section level conflict resolution circuit 120, with signal paths running between the figures being identified with corresponding lower case alpha characters. All section level conflict resolution circuits 54-57 are indentical to circuit 120. Section level conflict resolution circuit 120 is generally organized into four functionally equivelent subcircuits, each of which process or control memory reference requests originating from the ports associated with a particular CPU. For instance, with respect to subcircuit 125 (handling requests from CPU 0) there is provided gates 130, 131 and 132, a bank conflict checking circuit 133, conflict resolution logic 134, and register circuits 135 and 136. Gate 130 sees one input from one of the port gating circuits, for example gating circuit 71, which input will comprise a reference from either port A, port B or port C. Gate 131 receives reference requests from the I/O port associated with CPU 0, e.g. I/O port 60. The output of gates 130 and 131 are inputted to gate 132. A reference selected by gate 132 is applied to CPU 0 section reference register circuit 135, and in addition is monitored by CPU 0 bank conflict checking circuit 133 and simultaneous bank conflict checking circuit 140.

Bank conflict checking circuit 133 is connected to bank busy monitoring circuit 142, which monitors each individual bank in its corresponding section of memory. As mentioned hereinabove, reference may be made to a bank no more than once every four clock periods. Thus, bank busy monitoring circuit 142 monitors the release of references to the various banks of the memory and generates a corresponding bank busy signal for a busy bank when appropriate. Each of the bank conflict checking circuits of subcircuits 125-128 compares the bank required for a reference selected by gate 132 with the corresponding bank busy signal to generate a signal (via signal path 150 in the case of bank conflict checking circuit 133 for instance) indicitive of whether or not the desired bank is available.

Simultaneous bank conflict checking circuit 140 is provided to detect simultaneous attempts by different subcircuits to reference the same bank. Thus, in the case where two different CPU's are each attempting to access the same bank at the same time, which bank is currently available or not busy, simultaneous bank conflict checking circuit 140 prevents more than one CPU from generating a reference to the available bank at the same time, preferring one reference over another according to a predetermined hierachy. Checking circuit 140 accordingly monitors all references and generates a "simultaneous" conflict signal to the conflict resolution logic of each of subcircuits 125-128, for instance conflict resolution logic 134.

Conflict resolution logic 134 and its corresponding circuits each receive an input from the corresponding one of fetch or exchange control circuits 160 and 161, which provide control for fetch or exchange operations for CPU's 0 and 1 and CPU's 2 and 3, respectively. As mentioned above, a "fetch" operation involves the retrieval of instructions from the memory for loading into the corresponding instruction buffers in the CPU's 0-3, while an "exchange" operation involves the exchanging of data between the various data holding registers in the CPU's and memory. As inferred above the present invention provides that fetch or exchange operations may proceed without interference from routine references originating from other CPU's, which requires that certain banks be reserved for the fetching or exchanging CPU during the operation. For this purpose the present invention provides that CPU's are paired for sharing the data (read) paths and that instructions or exchange "data packages" are stored entirely in either the upper or lower eight banks of each section of the memory in consecutively addressable locations. Thus, for any given operation only one-half (i.e. either the upper or lower) of the sixteen banks in each section need be reserved with respect to the non-referencing pair, whereby, for instance, CPU's 2 and 3 may access at least half the memory's banks while either CPU 0 or 1 performs a fetch or exchange operation. Of course, however, the non-referencing CPU in the fetch or exchange pair may not perform any references until its counterpart has completed its operation because its four dedicated data paths are not available.

Whenever a CPU needs to perform a fetch or exchange operation it sends a signal indicitive thereof to the appropriate one of fetch or exchange control circuits 160 or 161, which generate the necessary control signals to reserve the necessary banks and force a conflict on the non-referencing CPU in the pair. For instance, if CPU 0 signals to circuit 160 it will perform either a fetch or exchange operation in the lower eight banks of the various memory sections, circuit 160 will force reference conflicts on CPU 1 via the F+X input to the conflict logic in each of the CPU 1 subcircuits (e.g. 180), such that CPU 1 will be inhibited from generating any references until the CPU 0 operation is over. In addition, circuit 160 will force conflicts on the appropriate eight banks (i.e. either upper or lower) in CPU's 2 and 3, via the F+X signal inputs, thus providing that the CPUs will not interfere with the operation in the reserved banks and permitting the CPUs to continue reference operations in the unreserved banks. In the case of fetch operations it is necessary that a conflict be forced on the fetching CPU because previously executed instructions calling for data transfers to the CPU will have to be interrupted if still executing. While the same is done for exchange operations it is not necessary because by definition an exchange operation will not take place until all pending instructions have been executed (or i.e. data transfers are completed).

Accordingly, each of the conflict resolution logic circuits (e.g. 134) receives a bank conflict check signal, a simultaneous bank conflict check signal, and a fetch or exchange conflict signal via which it may be determined whether or not a reference may be issued to a particular bank of the memory. If, for whatever reason, a reference may not proceed, the conflict resolution logic causes the reference to be held in the appropriate one of registers 135 and 136, and to be resubmitted when the conflict clears. Conflicts which occur with respect to references generated by the A, B, C ports are treated independently of references generated by the I/O port. Thus, where a reference generated by an I/O port cannot proceed that port will be prevented from generating further references but references may continue to be generated by the A, B, C ports. And, where anyone of the references generated by the A, B or C ports of a CPU is held due to a conflict no further references from any of the A, B or C ports of the CPU may be made, i.e. the references are held by the corresponding port conflict resolution circuit (65–68), until the held reference can proceed; however, I/O port references may proceed while the A, B or C ports are held. The reason that all A, B or C port references must be held if anyone reference therefrom has a conflict at the section level conflict resolution circuit level is because the identity of the referencing port is not carried through the section level and thus selective holds are not possible. As indicated in FIGS. 2A and 2B, each subcircuit conflict resolution logic (e.g. 134, 180) generates two conflict signals, one corresponding to conflicts from A, B, C port references and one to the I/O port references. These conflict signals are applied back to their corresponding CPU ports, i.e. the former to the A, B, C ports and the latter to the I/O port.

The conflict signals generated by the conflict resolution logic are also conveyed to the corresponding CPU conflict resolution logic of the other three section conflict resolution circuits 54–57. Accordingly, when a conflict is detected, the other section conflict resolution circuits (54–57) inhibit subsequent references from the same source (i.e. A, B, C ports treated in common or I/O ports) from being issued to memory until the preceeding reference from the same source is issued. Thus, the present invention prevents references from being generated out of order.

With respect to conflict resolution, the present invention provides at the port level (i.e. within a CPU), that in the case of simultaneous reference conflicts priority is awarded to odd increment references over even increment references, and in the case of references having the same increment (i.e. either odd or even) to the first issued reference. At the bank level, conflicts are only possible as between CPU's and are resolved in accordance with a scanner time-slot system which awards highest priority to a different processor every four clock periods, such that each processor rotates through a priority rating of one to four every sixteen clock periods.

Since ports A, B and C are treated in common by the section level conflict the banks are arranged to prevent a continuous conflict pattern for reference requests to successive banks from multiple ports (i.e. A and B etc.) within a CPU. More particularly, given a typical reference request, i.e. one that progresses from bank to bank in order (i.e. 0, 1, 2, 3), the present invention provides that two or more requests from the same CPU of such a nature will "synchronize" automatically. For instance, if CPU 0 port A generates a series of references beginning at bank 0 and progressing from bank to bank thereafter, one bank at a time, and CPU 0 port B follows immediately with a similar request and a lower priority, the ports will synchronize to avoid a continuous conflict pattern because port B's request to bank 0 will not be permitted to proceed (because of a conflict with the port A reference at the section 0 gate 71) until the port A reference has at least finished referencing bank 3 in section 0 at which time bank 0 will no longer be busy (each bank requires four clock periods to complete a reference). Thus, the port B references will "follow" the port A references at least 1 section of memory behind and thus avoid further port level and bank level conflicts. This example is of course only illustrative, and it shall be understood that this operation will result in synchronized referencing in some other situations.

As configured, the present invention provides for the resolution of conflicts in a two clock cycle period, which time includes whatever propagation delays encountered by references emanating from ports A, B or C before reaching the "port" level conflict resolution circuits 65–68. Thus, during a first clock cycle references propagate to the port level conflict resolution circuits and all conflicts at this level are resolved. During the next clock cycle references from the A, B, or C ports are conveyed to the section level conflict resolution circuits 54–57, all conflicts are resolved, and either the references are issued or held. Thus, there is a two clock cycle delay introduced between the A, B or C ports and memory. By this "bifurcated" or two step resolution the quantity of logic needed to resolve conflicts may be reduced (as opposed to a one-step system), permitting a reduction in logic cost and space requirements, and providing addition time for signal propagation owing to the fewer logic levels per "step" needed.

Thus, the present invention provides a memory interface system via which large numbers of memory references may be routed to a shared memory in an orderly and expedited fashion. Moreover, the present invention provides a system in which the resolution logic is bifurcated to accommodate propagation delays in the system which result from the general inability to "pack" processors extremely close together.

What is claimed is:

1. In a multiprocessor computer system including a main memory organized into a plurality of sections each consisting of a plurality of individually addressable memory banks, and wherein each processor includes a plurality of reference generating ports which may generate memory references to any one of said sections and banks, a memory reference interface between said processors and said sections comprising:

section level bank conflict resolution means, one for each of said sections of memory, each for receiving reference requests and resolving conflicts between said reference requests;

port level gating means, one associated with each of said processors, each for receiving reference requests from each of the ports associated with its respective processor and gating said reference requests to the associated one of said section level bank conflict resolution means in accordance with the bank to which the request is directed, said port level gating means permitting only one reference per memory section to be gated at a time;

port level section conflict resolution means, one associated with each of said processors, each for monitoring reference requests generated by the ports of its respective processor and detecting whether conflicts between reference requests to the same section of memory exist, and if conflicts are detected, determining which one reference request may proceed to each section of memory through said port level gating means and causing the other conflicting reference requests to be held by the port that generated them;

each of said section level bank conflict resolution means comprising:

a plurality of input gating means, one associated with each processor, each for selectively gating either a reference request gated through said port level gating means or a resubmitted reference request previously gated therethrough but which could not proceed to the memory due to a conflict;

bank busy means for monitoring each bank in the associated memory section and generating a set of busy signals each one indicative of the activity status of a particular bank in said associated memory section;

a plurality of bank conflict checking means each receiving the reference requests gated through a respective one of said input gating means and said set of busy signals for determining the availability of the bank required for a received reference request and generating a bank busy conflict signal indicative of whether or not the checked reference request may proceed;

simultaneous bank conflict checking means receiving all reference requests gated through said input gating means simultaneously for determining if any of said simultaneous reference requests are directed to the same bank and for generating a set of simultaneous request conflict indicating signals each one corresponding to a respective one of said received simultaneous references; and means receiving said bank busy and simultaneous request conflict indicating signals for resolving conflicts between reference requests submitted to said section level bank conflict resolution means, determining which reference requests may proceed to the memory, causing permissible reference requests to be issued to the memory, causing conflicting impermissible reference requests to be resubmitted to their associated input gating means, and causing the port level section conflict resolution means and associated processor to hold the procession of subsequent reference requests when a reference request associated therewith cannot proceed.

2. A multiprocessor computer system comprising:

a main memory organized into a plurality of sections each consisting of a plurality of individually addressable memory banks;

a plurality of processors each including a plurality of reference generating ports which may generate memory references to any one of said sections and banks;

section level bank conflict resolution means, one for each of said sections of memory, each for receiving reference requests and resolving conflicts between said reference requests;

port level gating means, one associated with each of said processors, each for receiving reference requests from each of the ports associated with its respective processor and gating said reference requests to the associated one of said section level bank conflict resolution means in accordance with the bank to which the request is directed, said port level gating means permitting only one reference per memory section to be gated at a time;

port level section conflict resolution means, one associated with each of said processors, each for monitoring reference requests generated by the ports of its respective processor and detecting whether conflicts between reference requests to the same section of memory exist, and if conflicts are detected, determining which one reference request may proceed to each section of memory through said port level gating means and causing the other conflicting reference requests to be held by the port that generated them;

each of said section level bank conflict resolution means comprising:

a plurality of input gating means, one associated with each processor, each for selectively gating either a reference request gated through said port level gating means or a resubmitted reference request previously gated therethrough but which could not proceed to the memory due to a conflict;

bank busy means for monitoring each bank in the associated memory section and generating a set of busy signals each one indicative of the activity status of a particular bank in said associated memory section;

a plurality of bank conflict checking means each receiving the reference requests gated through a respective one of said input gating means and said set of busy signals for determining the availability of the bank required for a received reference request and generating a bank busy conflict signal indicative of whether or not the checked reference request may proceed;

simultaneous bank conflict checking means receiving all reference requests gated through said input gating means simultaneously for determining if any of said simultaneous reference requests are directed to the same bank and for generating a set of simultaneous request conflict indicating signals each one corresponding to a respective one of said received simultaneous references; and means receiving said bank busy and simultaneous request conflict indicating signals for resolving conflicts between reference requests submitted to said section level bank conflict resolution means, determining which reference requests may proceed to the memory, causing permissible reference requests to be issued to the memory, causing conflicting impermissible reference requests to be resubmitted to their associated input gating means, and causing the associated port level section conflict resolution means and associated processor to hold the procession of subsequent reference requests when a reference request associated therewith cannot proceed.

3. The multiprocessor computer system of claim 2 wherein the means receiving said bank busy and simultaneous request conflict indicating signals includes:

means for assigning priority between the processors on a rotating basis;

means for handling reference requests so that a reference is allowed to proceed to the requested bank if there is no bank busy conflict and no simultaneous request conflict;

means for handling simultaneous request conflicts so that the reference from the highest priority processor with no bank busy conflict is allowed to proceed to the requested bank; and means for holding reference requests when there is a bank busy conflict or simultaneous request conflict.

4. The multiprocessor computer system of claim 2 wherein each of said port level section conflict resolution means includes:

section busy conflict means for determining for each reference request whether the memory section containing the requested bank is already being referenced by one of the ports associated with its respective processor;

means for determining whether there are simultaneous reference requests to banks within the same section of memory from more than one of the ports associated with its respective processor;

means for assigning priority between the ports associated with its respective processor, a port with a reference request having an odd address increment having priority over a port with a reference request having an even address increment and where ports have reference requests with the same increment the earliest activated port reference having priority;

means for handling reference requests so that a request is gated through said port level gating means associated with its respective processor if there is no conflict due to the memory section already being referenced and if there is no conflict due to simultaneous reference requests to banks within the same memory section; and means for handling conflicts between simultaneous reference requests to banks within the same memory section so that the reference request from the highest priority port is gated through said port level gating means associated with its respective processor if there is no conflict due to the memory section already being referenced.

5. A multiprocessor computer system, comprising:

a main memory organized into a plurality of sections each consisting of a plurality of individually addressable memory banks, said banks organized in said sections such that each section includes groups of n consecutive banks, where n equals the number of clock periods required for a bank to perform a reference, said groups interleaved throughout said memory sections in a consecutive manner;

a plurality of processors each including a plurality of reference generating ports which may generate memory references to any one of said sections and banks;

section level bank conflict resolution means, one for each of said sections of memory, each for receiving reference requests and resolving conflicts between said reference requests;

port level gating means, one associated with each of said processors, each for receiving reference requests from each of the ports associated with its respective processor and gating said reference requests to the associated one of said section level bank conflict resolution means in accordance with the bank to which the request is directed, said port level gating means permitting only one reference per memory section to be gated at a time;

port level section conflict resolution means, one associated with each of said processors, each for monitoring reference requests generated by the ports of its respective processor and detecting whether conflicts between reference requests to the same section of memory exist, and if conflicts are detected, determining which one reference request may proceed to each section of memory through said port level gating means and causing the other conflicting reference requests to be held by the port that generated them;

each of said section level bank conflict resolution means comprising:

a plurality of input gating means, one associated with each processor, each for selectively gating either a reference request gated through said port level gating means or a resubmitted reference request previously gated therethrough but which could not proceed to the memory due to a conflict;

bank busy means for monitoring each bank in the associated memory section and generating a set of busy signals each one indicative of the activity status of a particular bank in said associated memory section;

a plurality of bank conflict checking means each receiving the reference requests gated through a respective one of said input gating means and said set of busy signals for determining the availability of the bank required for a received reference request and generating a bank busy conflict signal indicative of whether or not the checked reference request may proceed;

simultaneous bank conflict checking means receiving all reference requests gated through said input gating means simultaneously for determining if any of said simultaneous reference requests are directed to the same bank and for generating a set of simultaneous request conflict indicating signals each one corresponding to a respective one of said received simultaneous references; and means receiving said bank busy and simultaneous request conflict indicating signals for resolving conflicts between reference requests submitted to said section level bank conflict resolution means, determining which reference requests may proceed to the memory, causing permissible reference requests to be issued to the memory, causing conflicting impermissible reference requests to be resubmitted to their associated input gating means, and causing the port level section conflict resolution means and associated processor to hold the procession of subsequent reference requests when a reference request associated therewith cannot proceed.

6. A multiprocessor computer system comprising:
a main memory organized into a plurality of sections each consisting of a plurality of individually addressable memory banks;
a plurality of processors each including a plurality of reference generating ports which may generate memory references to any one of said sections and banks;
section level bank conflict resolution means, one for each of said sections of memory, each for receiving reference requests and selectively conveying reference requests to its associated memory section;
port level gating means, one associated with each of said processors, each for receiving reference requests from each of the ports associated with its respective processor and gating said reference requests to the associated one of said section level bank conflict resolution means in accordance with the bank to which the request is directed;
port level section conflict resolution means, one associated with each of said processors, each for monitoring reference requests generated by the ports of its respective processor and controlling the gating of requests through the port level gating means associated with its respective processor, each of said port level section conflict resolution means comprising:
bank detection means for determining which of said memory banks within the main memory has been requested;
section busy conflict means for determining for each reference request whether the memory section containing the requested bank is already being referenced by one of the ports associated with its respective processor;
means for determining whether there are simultaneous reference requests to banks within the same section of memory from more than one of the ports associated with its respective processor; and
means for resolving section busy conflicts and conflicts between simultaneous reference requests to banks within the same memory section so that only one reference request to any one memory section is gated through said port level gating means associated with its respective processor at any one time;
each of said section level bank conflict resolution means comprising:
bank busy conflict means for determining for each reference request whether the requested memory bank is ready to be referenced or whether said bank is busy;
means for comparing all of the received reference requests to determine if there are any simultaneous reference requests to the same bank from different processors;
means for resolving bank busy conflicts and conflicts between simultaneous reference requests to the same bank so that only one reference to any one memory bank is allowed at one time and only one memory reference to the memory section associated with said section level bank conflict resolution means from any one processor is allowed at one time.

7. The multiprocessor memory system of claim 6 wherein each of said port level section conflict resolution means further includes:
means for signalling the ports associated with its respective processor that have a reference being held at said port level section conflict resolution means so that said ports do not generate another reference request, and wherein said section level bank conflict resolution means further includes:
means for signalling the port level section conflict resolution means associated with the processors that have a reference being held at said section level bank conflict resolution means so that the ports associated with said processors do not generate another reference request.

8. A method of conveying memory references from the processors to the main memory and resolving memory reference conflicts in a multiprocessor computer system, said system including:
a main memory organized into a plurality of sections each consisting of a plurality of individually addressable memory banks;
a plurality of processors each including a plurality of reference generating ports which may generate memory references to any one of said sections and banks;
section level bank conflict resolution circuits, one for each of said sections of memory, each for receiving reference requests and selectively conveying reference requests to its associated memory section;
port level gating circuits, one associated with each of said processors, each for receiving reference requests from each of the ports associated with its respective processor and gating said reference requests to the associated one of said section level bank conflict resolution circuits in accordance with the bank to which the request is directed, each of said port level gating circuits permitting only one reference per memory section to be gated at a time;
port level section conflict resolution circuits, one associated with each of said processors, each for monitoring reference requests generated by the ports of its respective processor and controlling the gating of reference requests through the port level gating circuit associated with its respective processor;
within a port level section conflict resolution circuit, said method comprising the steps of:
(a) monitoring reference requests from said ports associated with its respective processor;
(b) determining for each reference request which of said memory banks within the main memory has been requested;
(c) determining for each reference request whether the memory section containing the requested bank is already being referenced by one of the ports associated with its respective processor;
(d) determining whether there are simultaneous reference requests to banks within the same section of memory from more than one of the ports associated with its respective processor;

(e) assigning priority between the ports associated with its respective processor, a port with a reference request having an odd address increment having priority over a port with a reference request having an even address increment and where the ports have reference requests with the same increment the earliest activated port reference having priority;

(f) handling reference requests so that a request is gated through said port level gating circuit associated with its respective processor if the memory section requested is not already being referenced by one of the ports associated with its respective processor and if there are no simultaneous reference requests to banks within the same memory section by another of the ports associated with its respective processor;

(g) handling simultaneous reference requests to the same section of memory from more than one of the ports associated with its respective processor so that the reference request from the highest priority port is gated through said port level gating circuit associated with its respective processor if the memory section containing the bank requested by the highest priority port is not already being referenced;

(h) holding reference requests when the memory section containing the requested bank is already being referenced and when the request has a conflict with a request from a higher priority port; within a section level bank conflict circuit, said method comprising the steps of:

(i) receiving reference requests from said port level gating circuits;

(j) monitoring each bank in the associated memory section and generating a set of busy signals each one indicative of the activity status of a particular bank in said associated memory section;

(k) comparing all of the received reference requests to said set of busy signals to determine the availability of the requested memory banks;

(l) comparing all of the received reference requests to determine if there are any simultaneous reference requests to the same bank from different processors;

(m) assigning priority between the processors on a rotating basis;

(n) handling reference requests so that a request is allowed to proceed to the requested bank if there is no bank busy conflict and no simultaneous reference request to the same bank from a different processor;

(o) handling conflicts between simultaneous reference requests from different processors so that the reference from the highest priority processor with no bank busy conflict is allowed to proceed to the requested bank; and (p) holding reference requests when the requested bank is busy or when there is a conflict with a higher priority processor.

9. The method of claim 8 further comprising within a port level section conflict resolution circuit the step of:

(a) sending a signal to all of the ports associated with its respective processor that have a reference being held at said port level section conflict resolution circuit so that said ports do not generate another reference request.

10. The method of claim 8 further comprising within a section level bank conflict resolution circuit the step of:

(a) sending a signal to the port level section conflict resolution circuits associated with the processors that have a reference being held at said section level bank conflict resolution circuit so that the ports associated with said processors do not generate another reference request.

11. The method of claim 8 further comprising within a section level bank conflict resolution circuit the steps of:

(a) resubmitting held reference requests; and
(b) for each processor, selecting either a reference request received from the port level gating circuit associated with said processor or a resubmitted reference request from said processor.

12. The method of claim 8 further comprising between different section level bank conflict resolution circuits the step of:

(a) sending a hold signal to all of the section level bank conflict resolution circuits that have received a reference request from a processor issued subsequent to a held reference generated by that processor so that reference requests from the ports of that processor are kept in the order generated.

13. A method of conveying memory reference from the processors to the main memory and resolving memory reference conflicts in a multiprocessor computer system, said system including:

a main memory organized into a plurality of sections each consisting of a plurality of individually addressable memory banks;

a plurality of processors each including a plurality of reference generating ports which may generate memory references to any one of said sections and banks;

section level bank conflict resolution circuits, one for each of said sections of memory, each for receiving reference requests and selectively conveying reference requests to its associated memory section;

port level gating circuits, one associated with each of said processors, each for receiving reference requests from each of the ports associated with its respective processor and gating said reference requests to the associated one of said section level bank conflict resolution circuits in accordance with the bank to which the request is directed; and port level section conflict resolution circuits, one associated with each of said processors, each for monitoring reference requests generated by the ports of its respective processor and controlling the gating of requests through the port level gating circuit associated with its respective processor; within a port level section conflict resolution circuit, said method comprising the steps of:

(a) monitoring reference requests from said ports associated with its respective processor;

(b) determining for each reference request which of said memory banks within the main memory has been requested;

(c) determining for each reference request whether the memory section containing the requested bank is already being referenced by one of the ports associated with its respective processor;

(d) determining whether there are simultaneous reference requests to banks within the same section of memory from more than one of the ports associated with its respective processor;

(e) resolving conflicts due to the requested memory section already being referenced and conflicts between simultaneous reference requests to banks within the same memory section so that only one reference request to any one memory section is gated through said port level gating circuit associated with its respective processor at any one time; within a section level bank conflict resolution circuit, said method comprising the steps of:

(f) receiving reference requests from said port level gating circuits;

(g) checking the status of each requested memory bank to determine whether said bank is ready to be referenced or whether said bank is busy;

(h) comparing all of the received reference requests to determine if there are any simultaneous reference requests to the same bank from different processors.

(i) resolving bank busy conflicts and conflicts between simultaneous reference requests to the same bank so that only one reference to any one memory bank is allowed at one time and only one memory reference to the memory section associated with said section level bank conflict resolution circuit from any one processor is allowed at one time.

* * * * *

UNITED STATES PATENT AND TRADEMARK OFFICE
CERTIFICATE OF CORRECTION

PATENT NO. : 4,745,545
DATED : 5/17/88
INVENTOR(S) : Alan J. Schiffleger

It is certified that error appears in the above-identified patent and that said Letters Patent is hereby corrected as shown below:

IN THE SPECIFICATION:

Column 1, line 48 delete "desireable" and insert --desirable--.

Column 1, line 59 delete "desireable" and insert --desirable--.

Column 4, line 5 delete "Γ" and insert --64--.

Column 5, line 60 delete "indentical" and insert --identical--.

Column 5, line 62 delete "equivelent" and insert --equivalent--.

Column 6, line 24 delete "indicitive" and insert -indicative--.

Column 7, line 4 delete "indicitive" and insert --indicative--.

Column 7, line 53 delete "anyone" and insert --any one--.

Column 8, lines 4-5 delete "preceeding" and insert --preceding--.

Column 18, line 7, after "processors" delete --.--and insert --;--.

Signed and Sealed this

Seventh Day of February, 1989

Attest:

DONALD J. QUIGG

Attesting Officer

Commissioner of Patents and Trademarks